(12) United States Patent
Hsu et al.

(10) Patent No.: US 12,420,436 B2
(45) Date of Patent: Sep. 23, 2025

(54) ELECTRIC GRIPPER

(71) Applicant: Delta Electronics, Inc., Taoyuan (TW)

(72) Inventors: Chih-Ming Hsu, Taoyuan (TW);
Hsin-Hsien Wu, Taoyuan (TW);
Shang-Wei Yang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 806 days.

(21) Appl. No.: 17/742,195

(22) Filed: May 11, 2022

(65) Prior Publication Data
US 2023/0083690 A1    Mar. 16, 2023

(30) Foreign Application Priority Data

Sep. 3, 2021 (CN) .......................... 202122115016.5

(51) Int. Cl.
*B25J 15/02* (2006.01)
(52) U.S. Cl.
CPC ................................ *B25J 15/0266* (2013.01)
(58) Field of Classification Search
None
See application file for complete search history.

(56) References Cited

U.S. PATENT DOCUMENTS

| | | | | |
|---|---|---|---|---|
| 3,012,811 A * | 12/1961 | Sandrock | ............. | G21C 19/105 976/DIG. 251 |
| 4,348,044 A * | 9/1982 | Wood, III | ............... | B65G 47/90 294/115 |
| 5,072,652 A * | 12/1991 | Blatt | .................... | B25J 15/0206 294/115 |
| 5,131,706 A * | 7/1992 | Appleberry | .............. | B25J 15/04 294/119.1 |
| 6,076,875 A | 6/2000 | Neff et al. | | |
| 7,887,108 B1 * | 2/2011 | Cawley | .................. | B25J 15/022 414/731 |
| 8,419,097 B2 * | 4/2013 | Lunde | ..................... | E21B 19/14 294/115 |
| 9,878,483 B2 * | 1/2018 | Leroux | ................ | B65G 47/847 |

(Continued)

FOREIGN PATENT DOCUMENTS

| | | |
|---|---|---|
| CN | 205703380 U | 11/2016 |
| CN | 212527778 U | 2/2021 |
| CN | 111443437 B | 3/2021 |

*Primary Examiner* — William A. Rivera
(74) *Attorney, Agent, or Firm* — KIRTON McCONKIE; Evan R. Witt

(57) ABSTRACT

An electric gripper is disclosed and includes a carrier, an actuator, two dual-lever assemblies and an angle sensor. The actuator is disposed on the carrier and includes a sliding portion. The two dual-lever assemblies are disposed on the carrier and located at two opposite lateral sides of the sliding portion. Each of the two dual-lever assemblies includes a driving lever, a limiting lever and a gripping piece. The driving levers are staggered to each other. The limiting levers are staggered to each other. When the sliding portion slides a first distance in the first direction, the sliding portion drives the driving levers to rotate an angle, and the gripping pieces move toward each other to displace a second distance in a second direction. The angle sensor is disposed on the carrier and configured to measure the angle, to correspond to the first distance and the second distance.

15 Claims, 21 Drawing Sheets

(56) References Cited

U.S. PATENT DOCUMENTS

| | | | |
|---|---|---|---|
| 2008/0272609 A1* | 11/2008 | Knieling | B65G 47/847 294/90 |
| 2014/0008927 A1* | 1/2014 | Rousseau | B29C 49/42093 294/90 |
| 2014/0175819 A1* | 6/2014 | Wilson | B65G 47/90 294/198 |
| 2024/0399569 A1* | 12/2024 | Darnel | B25J 9/1653 |

* cited by examiner

ELECTRIC GRIPPER

FIELD OF THE INVENTION

The present disclosure relates to a gripper structure, and more particularly to an electric gripper for taking into account the miniaturization and providing position and force control in the application field of small clamping force.

BACKGROUND OF THE INVENTION

A robotic arm is an automatic control device having the function of imitating a human arm and capable of completing various tasks, and has been widely used in the automated mechanical device. In addition to being mainly used in industrial manufacturing, the applications of the robotic arm are found in the fields of the commercial agriculture, the medical rescue, the entertainment service and the military security. The structure of the robotic arm includes a mechanical main body, a controller, a servo mechanism and a sensor, and a certain designated action of the robotic arm is set by the program according to the operation requirement. The device installed at the end of the robotic arm for gripping an object directly is usually called as a gripper, an end effector or a robot hand. Its purpose is to replace the human fingers, skillfully complete many complex tasks or manipulate various objects. However, since the working range of the human fingers is relatively small, the choice of driving method for the electric gripper is different from that of the arm joints.

A motor is served as a driving source in the conventional gripper, so as to drive the mechanism to achieve the reciprocating movement of the gripper. However, the conventional stepping motor or the conventional DC motor has a large volume. If it is used in the application field of small clamping force, it is difficult to take into account the miniaturization of the overall volume and realize the position and force control accurately.

Therefore, there is a need of providing an electric gripper used in the application field of small clamping force to take into account the miniaturization of the overall volume, realize the position and force control accurately, and obviate the drawbacks encountered by the prior arts.

SUMMARY OF THE INVENTION

An object of the present disclosure is to provide an electric gripper. In the application field of small clamping force, the overall volume of the electric gripper is miniaturized and the position and force control is accurately realized. Preferably but not exclusively, a voice coil motor (VCM) is served as a driving device in the electric gripper. Moreover, two dual-lever assemblies are disposed in a staggered arrangement to form a thin design. Thus, the electric gripper is realized with low cost, small size, fast response speed and high precision, and the miniaturization of the volume design is achieved easily.

Another object of the present disclosure is to provide an electric gripper. The displacement distance in the first direction is transferred into the displacement distance in the second direction stably through the two dual-lever assemblies. When the two dual-lever assemblies are driven by for example a voice coil motor, the relative displacement and rotation relationship between the driver and the two dual-lever assemblies are sensed through the sensing element to sense the distance and the angle, thereby achieving the purpose of position control. On the other hand, since the actuator of the voice coil motor is controlled by electric current, the magnet set is driven by the coil, and the pushing force is provided stably in one direction, so that the torque of the electric gripper is not changed with the movement. In addition to the position control, the force control is taken into account.

A further object of the present disclosure is to provide an electric gripper. The actuator is cooperated with the thin design formed by the dual-lever assemblies, the configuration of the dual-lever assemblies is adjustable according to the practical requirements, and the force control and the detection of the electric gripper are realized through a force sensor combined therein. In addition, with the actuator cooperated with the thin design formed by the dual-lever assemblies, a self-locking function is achieved through a spring, so as to enhance the reliability and competitiveness of the product.

In accordance with an aspect of the present disclosure, an electric gripper is provided and includes a carrier, an actuator, two dual-lever assemblies and an angle sensor. The carrier includes a first side and a second side opposite to each other. The actuator is disposed on the carrier and includes a sliding portion. The actuator drives the sliding portion to slide along a first direction relative to the carrier. The two dual-lever assemblies are disposed on the carrier and located at two opposite lateral sides of the sliding portion. Each of the two dual-lever assemblies includes a driving lever, a limiting lever and a gripping piece. The driving levers of the two dual-lever assemblies are staggered to each other, and have first ends pivotally connected to the first side and the second side of the carrier, respectively, and connected to a front end of the sliding portion, and second ends pivotally connected to the corresponding gripping pieces. The limiting levers of the two dual-lever assemblies are staggered to each other, and have third ends pivotally connected to the first side and the second side of the carrier, respectively, and fourth ends pivotally connected to the corresponding gripping pieces. When the sliding portion slides a first distance in the first direction, the front end of the sliding portion drives the driving levers of the two dual-lever assemblies to rotate an angle, and the gripping pieces of the two dual-lever assemblies move toward each other to displace a second distance in a second direction. The angle sensor is disposed on the carrier and configured to measure the angle, so as to correspond to the first distance and the second distance.

In an embodiment, the driving levers of the two dual-lever assemblies are pivotally connected to two opposite sides of the front end of the sliding portion through an elongated hole, respectively, so as to be staggered to each other.

In an embodiment, the electric gripper further includes a control module connected to the actuator and the angle sensor, respectively, wherein the control module controls the actuator to slide and displace the first distance in the first direction, and a TABLE list is stored in the control module and recodes relationships among the angle, the first distance and the second distance.

In an embodiment, the driving lever and the corresponding limiting lever of the respective dual-lever assembly are staggered to each other.

In an embodiment, the driving lever and the corresponding limiting lever of the respective dual-lever assembly are located at different sides of the carrier.

In an embodiment, the driving lever is L-shaped, and the limiting lever is I-shaped.

In an embodiment, the gripping piece includes a clamping element.

In an embodiment, the sliding portion is disposed on the carrier through a pair of linear bearings, and the pair of linear bearings are arranged along the first direction, wherein the sliding portion includes an elongated frame, and a pair of long borders of the elongated frame penetrate the pair of the linear bearings along the first direction.

In an embodiment, the actuator is a voice coil motor and includes a coil and a magnet set, the coil is disposed between the pair of long borders, the magnet set is disposed on the pair of long borders, and the magnet set is spatially corresponding to two opposite sides of the coil.

In an embodiment, the angle sensor is a magnetic angular encoder disposed at a position where one of the driving levers of the two dual-lever assemblies is pivotally connected with the carrier.

In an embodiment, the electric gripper further includes a spring connected between the sliding portion and the carrier, and configured to provide a resilience force when the actuator is powered off, so that the sliding portion is slid to an initial position, wherein when the sliding portion is located at the initial position, the first distance, the second distance and the angle are zero, and the gripping pieces of the two dual-lever assemblies are in contact with each other.

In an embodiment, the electric gripper further includes a spring connected between the sliding portion and the carrier, and configured to provide a resilience force when the actuator is powered off, so that the sliding portion is slid to a final position, and the gripping pieces of the two dual-lever assemblies are separated from each other.

In an embodiment, the carrier includes a weakened region passed through the first side and the second side, and the electric gripper further includes a force sensor disposed in the weakened region of the carrier, and configured to measure a force exerted on the electric gripper.

In an embodiment, the electric gripper further includes an optical ruler disposed on the sliding portion, and is configured to measure the first distance that the sliding portion slides in the first direction.

In an embodiment, the electric gripper further includes a control module connected to the actuator and the angle sensor, respectively, wherein the control module includes a TABLE list stored therein, and relationships between the first distance and the second distance are recorded within the TABLE list.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
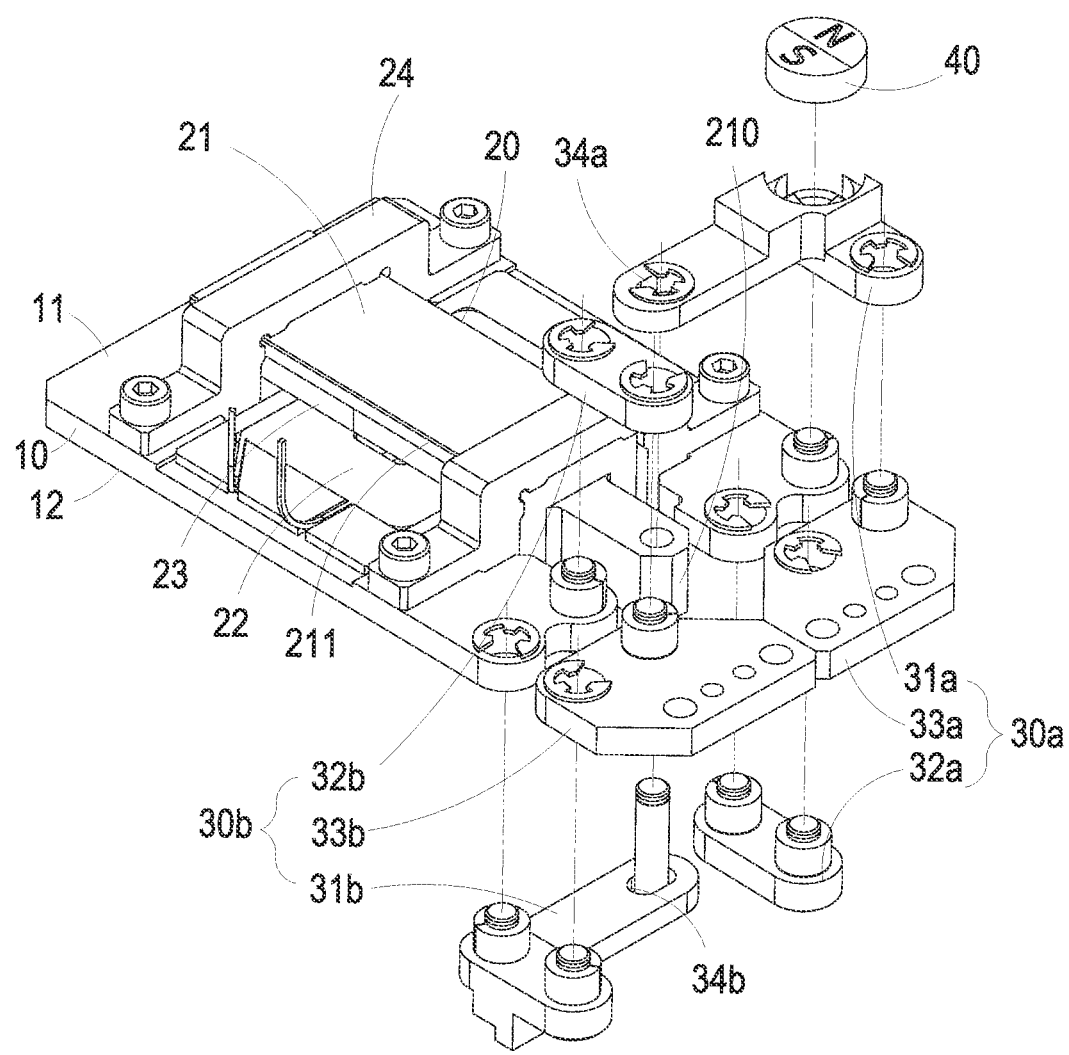
FIG. 1 is an exploded view illustrating an electric gripper according to a first embodiment of the present disclosure.
Figure 2:
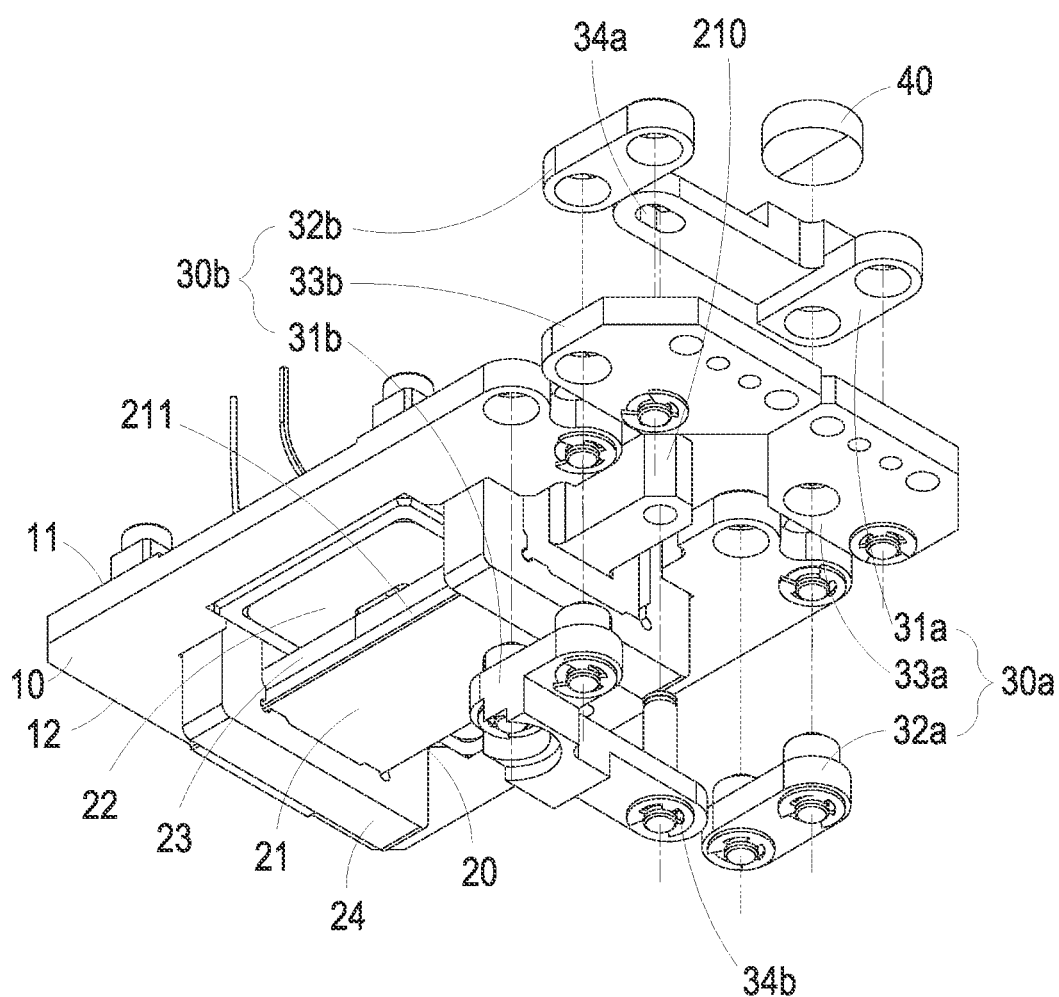
FIG. 2 is an exploded view illustrating the electric gripper according to the first embodiment of the present disclosure and taken from another perspective.
Figure 3:
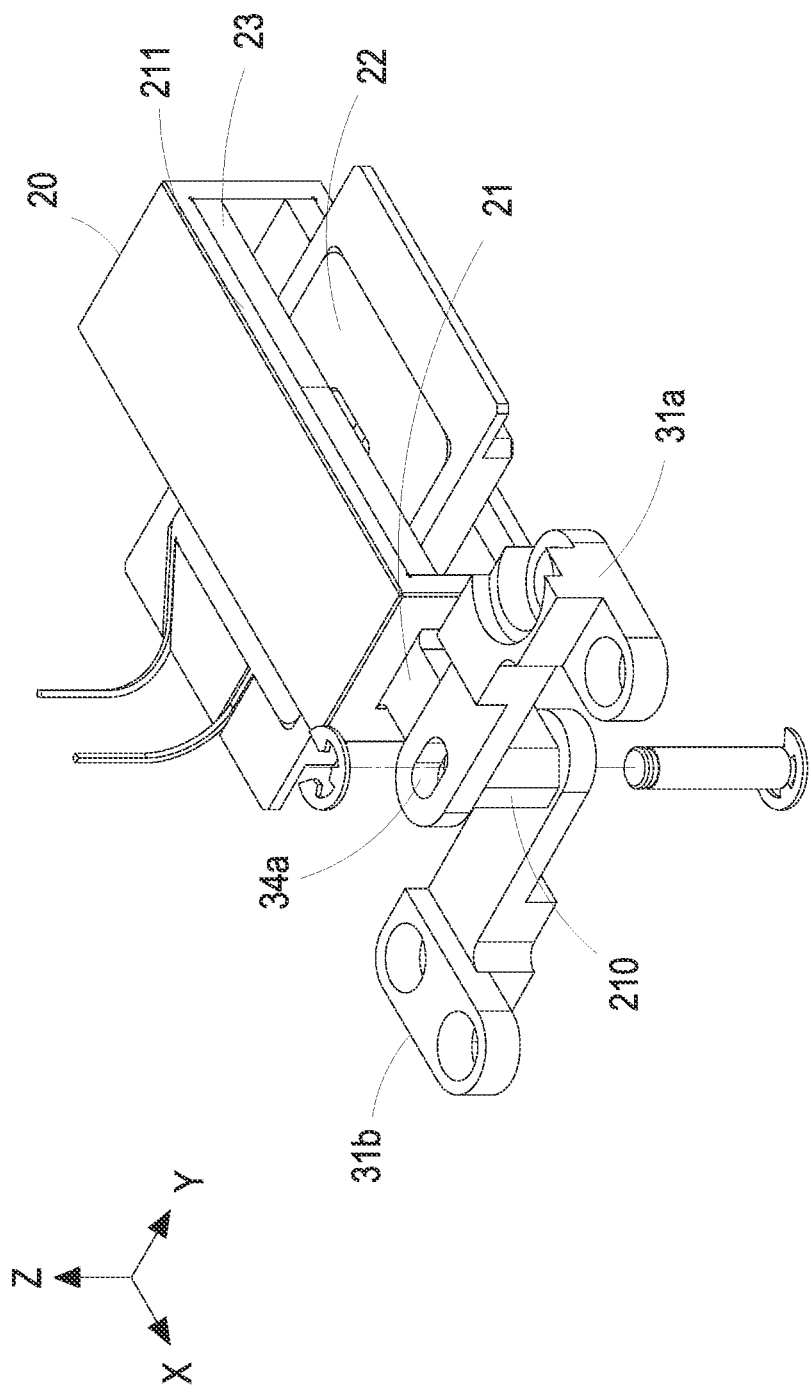
FIG. 3 is a schematic structural view illustrating the two driving levers of the electric gripper pivotally connected to the sliding portion in a staggered arrangement according to the first embodiment of the present disclosure.
Figure 4:
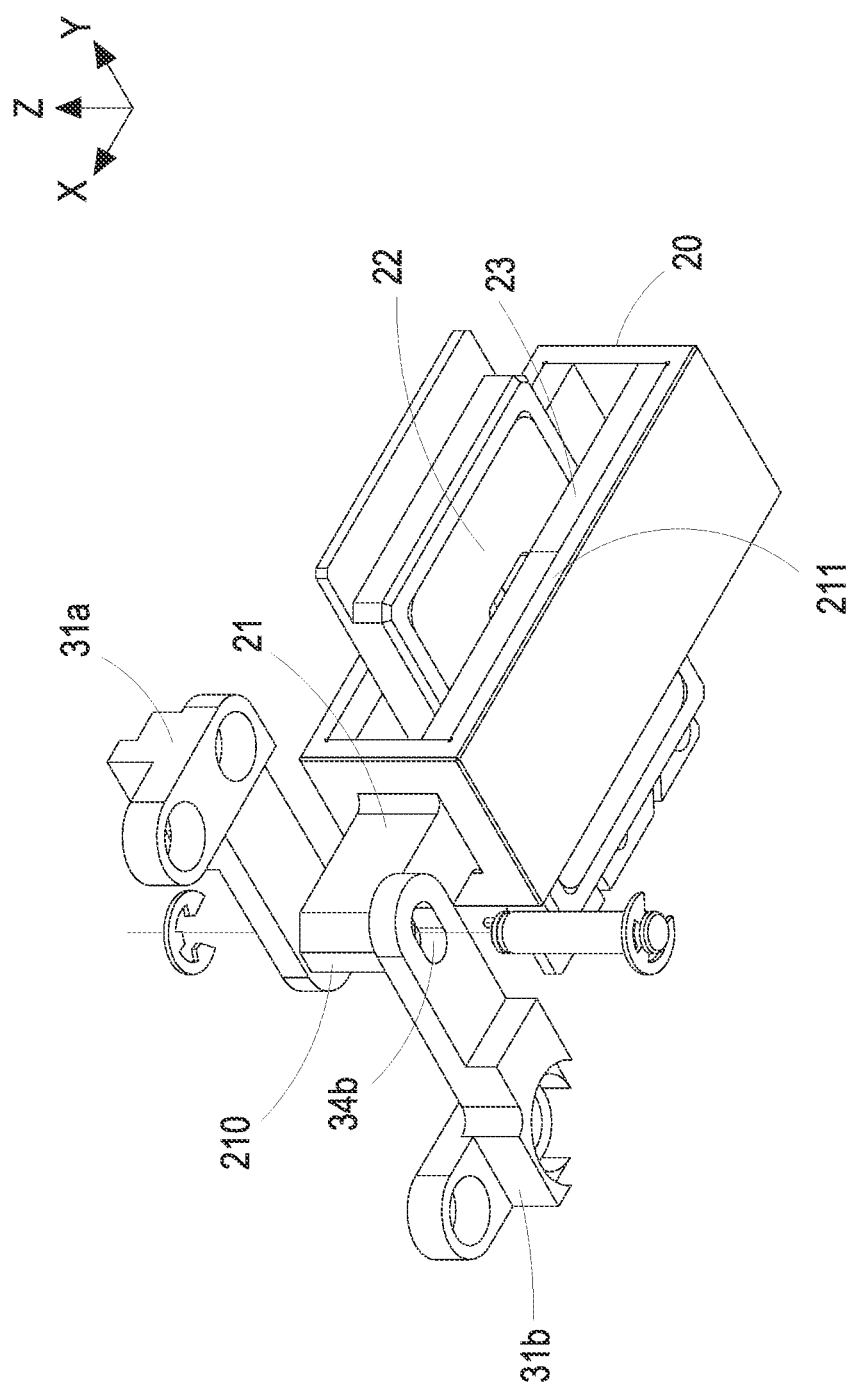
FIG. 4 is a schematic structural view illustrating the two driving levers of the electric gripper pivotally connected to the sliding portion in the staggered arrangement according to the first embodiment of the present disclosure and taken from another perspective.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

FIGS. 1 to 15 show an electric gripper according a first embodiment of the present disclosure. In the embodiment, a closed state of the electric gripper is taken as an initial position to explain the action of the electric gripper, but the operation of the electric gripper of the present disclosure is not limited thereto. In the embodiment, the electric gripper 1 includes a carrier 10, an actuator 20, two dual-lever assemblies 30 and an angle sensor 40. The carrier 10 includes a first side 11 and a second side 12 opposite to each other. The actuator 20 is disposed on the carrier 10 and includes a sliding portion 21. The actuator 20 drives the sliding portion 21 to slide in a first direction, for example the X-axis direction, relative to the carrier 10. Preferably but not exclusively, the two dual-lever assemblies 30 includes a first dual-lever assembly 30a and a second dual-lever assembly 30b, which are disposed on the carrier 10 and located at two opposite lateral sides of the sliding portion 21. In the embodiment, the first dual-lever assembly 30a includes a first driving lever 31a, a first limiting lever 32a and a first gripping piece 33a. The second dual-lever assembly 30b includes a second driving lever 31b, a second limiting lever 32b and a second gripping piece 33b. Preferably but not exclusively, the first driving lever 31a and the second driving lever 31b are L-shaped, and the first limiting lever 32a and the second limiting lever 32b are I-shaped. In the embodiment, the middle section of the first driving lever 31a is pivotally connected to the first side 11 of the carrier 10, and the middle section of the second driving lever 31b is pivotally connected to the second side 12 of the carrier 10, so that the first driving lever 31a of the first dual-lever assembly 30a and the second driving lever 31b of the second dual-lever assembly 30b are staggered to each other. Moreover, the first dual-lever assembly 30a and the second dual-lever assembly 30b have first ends pivotally connected to a front end 210 of the sliding portion 21, and the connection points are located at different sides of the front end 210. In the embodiment, the first driving lever 31a is pivotally connected to the upper side of the front end 210 of the sliding portion 21 through a first elongated hole 34a; and the second driving lever 31b is pivotally connected to the lower side of the front end 210 of the sliding portion 21 through a second elongated hole 34b, so that the first driving lever 31a and the second driving lever 31b are disposed in a staggered arrangement. The second end of the first driving lever 31a is pivotally connected to the first gripping piece 33a corresponding thereto. The second end of the second driving lever 31b is pivotally connected to the second gripping piece 33b corresponding thereto. In the embodiment, the first limiting lever 32a has a third end pivotally connected to the second side 12 of the carrier 10, and the second limiting lever 32b has a third end pivotally connected to the first side 11 of the carrier 10, so that the first limiting lever 32a of the first dual-lever assembly 30a and the second limiting lever 32b of the second dual-lever assembly 30b are staggered to each other and pivotally connected to the second side 12 and the first side 11 of the carrier 10. In addition, the first limiting lever 32a has a fourth end pivotally connected to the first gripping piece 33a corresponding thereto. The second lever 32b has a fourth end pivotally connected to the second gripping piece 33b corresponding thereto. In the embodiment, the first driving lever 31a and the corresponding first limiting lever 32a of the first dual-lever assembly 30a are located at the first side 11 and the second side 12 of the carrier 10, respectively, so as to be staggered to each other. The second driving lever 31b and the corresponding second limiting lever 32b of the second dual-lever assembly 30b are located at the second side 12 and the first side 11 of the carrier 10, respectively, so as to be staggered to each other. Thus, the first dual-lever assembly 30a and the second dual-lever assembly 30b are disposed in a staggered arrangement to form a thin design, set on the carrier 10 in a space-saving manner and connected to the sliding portion 21. It is helpful of achieving the miniaturization of the volume design. Certainly, the present disclosure is not limited thereto. Preferably but not exclusively, the angle sensor 40 is a magnetic angular encoder disposed at a position where the first driving lever 31a of the first dual-lever assembly 30a is pivotally connected with the carrier 10. In an embodiment, the angle sensor 40 is disposed at a position where the second driving lever 31b of the second dual-lever assembly 30b is pivotally connected with the carrier 10. In other embodiments, an alternative angle sensor is disposed on the carrier 10. The present disclosure is not limited thereto.

Figure 15:
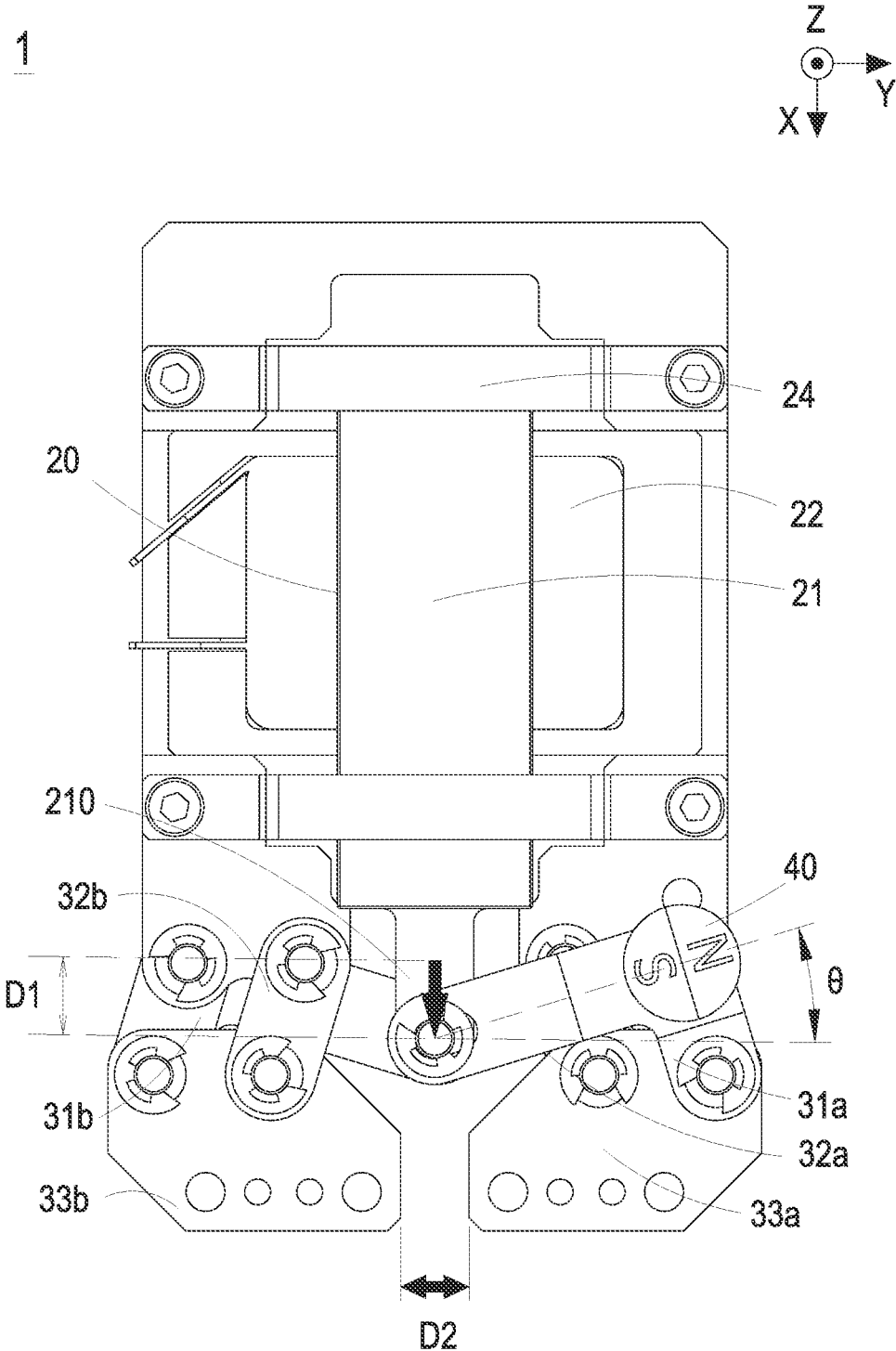
FIG. 15 is a top view illustrating the electric gripper operated in the open state according to the first embodiment of the present disclosure.

Please refer to FIG. 15. In the embodiment, when the actuator 20 drives the sliding portion 21 to slide a first distance D1 in the first direction (i.e. the X-axis direction), the front end 210 of the sliding portion 21 drives the first driving lever 31a of the first dual-lever assembly 30a to rotate an angle θ, and the first gripping piece 33a of the first dual-lever assembly 30a and the second gripping piece 33b of the second dual-lever assembly 30b move toward each other to displace, for example along the reserved Y-axis direction and the Y-axis direction, so that a gap therebetween is regarded as a second distance D2. At this time, the angle θ measured by the angle sensor 40 is used to correspond to the first distance D1 and the second distance D2. Preferably but not exclusively, the relationships among the angle θ, the first distance D1, and the second distance D2 are described in a TABLE list, and exemplified as follows.

TABLE list

| First distance D1 (mm) | Angle θ (degree) | Second distance D2 (mm) |
| --- | --- | --- |
| 0 | 0 | 0 |
| 1.057 | 3.18 | 1 |
| 2.124 | 6.38 | 2 |
| 3.212 | 9.59 | 3 |
| 4.331 | 12.84 | 4 |
| 5.494 | 16.13 | 5 |
| 6.718 | 19.47 | 6 |

Figure 5:
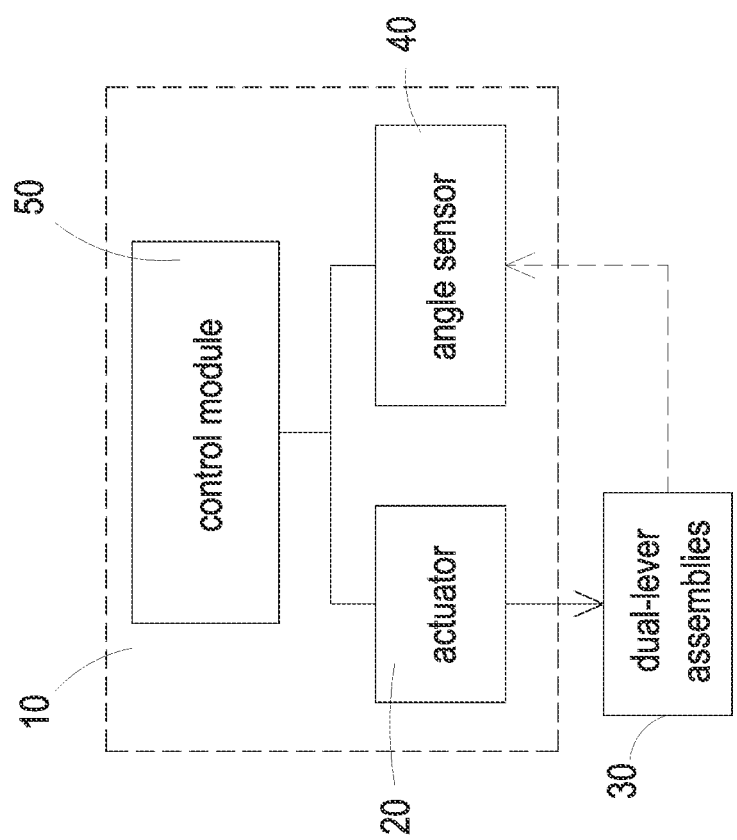
FIG. 5 is a block diagram of the electric gripper according to the first embodiment of the present disclosure.
Figure 6:
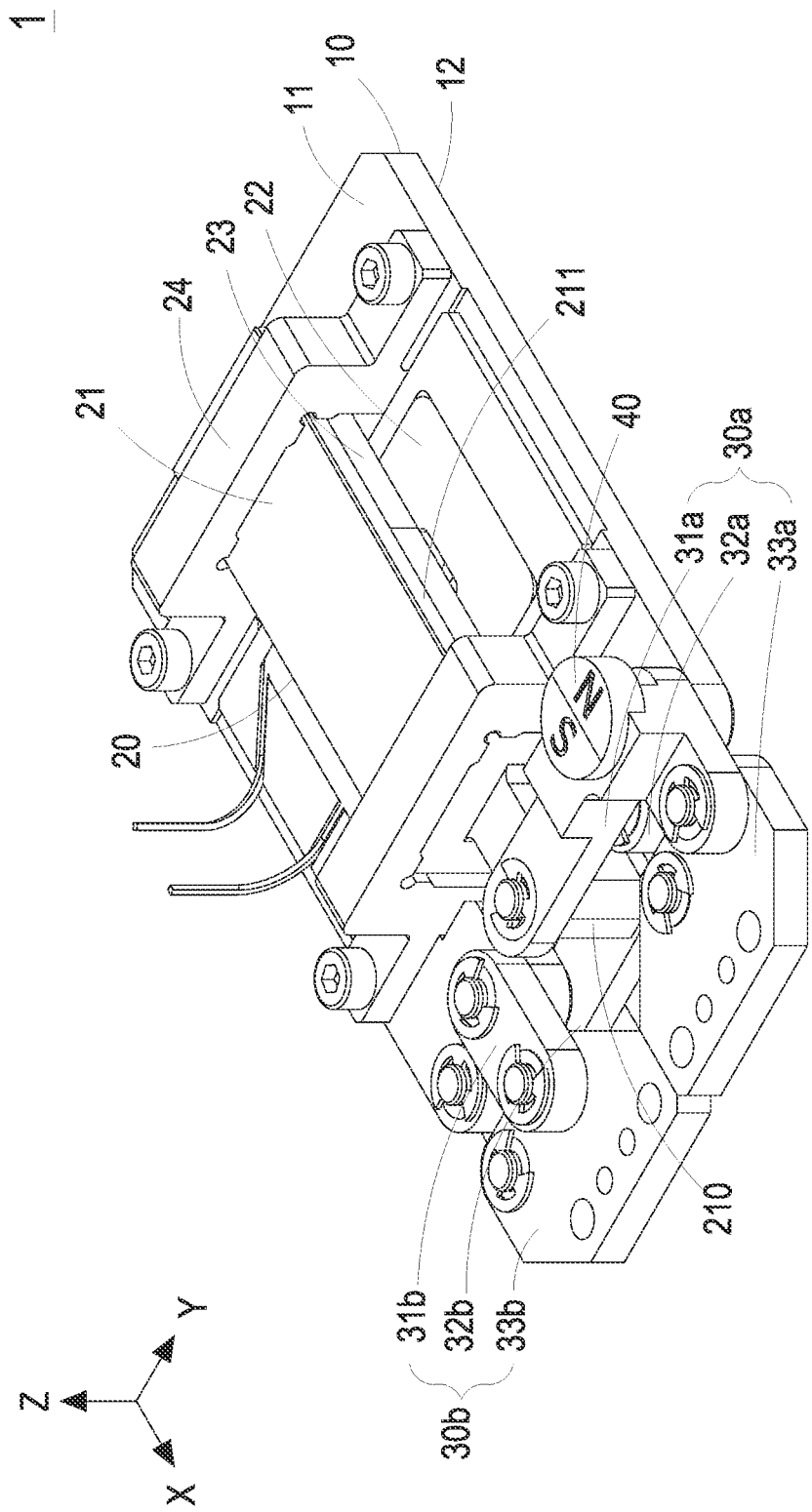
FIG. 6 is a schematic structural view illustrating the electric gripper operated in a closed state according to the first embodiment of the present disclosure.
Figure 7:
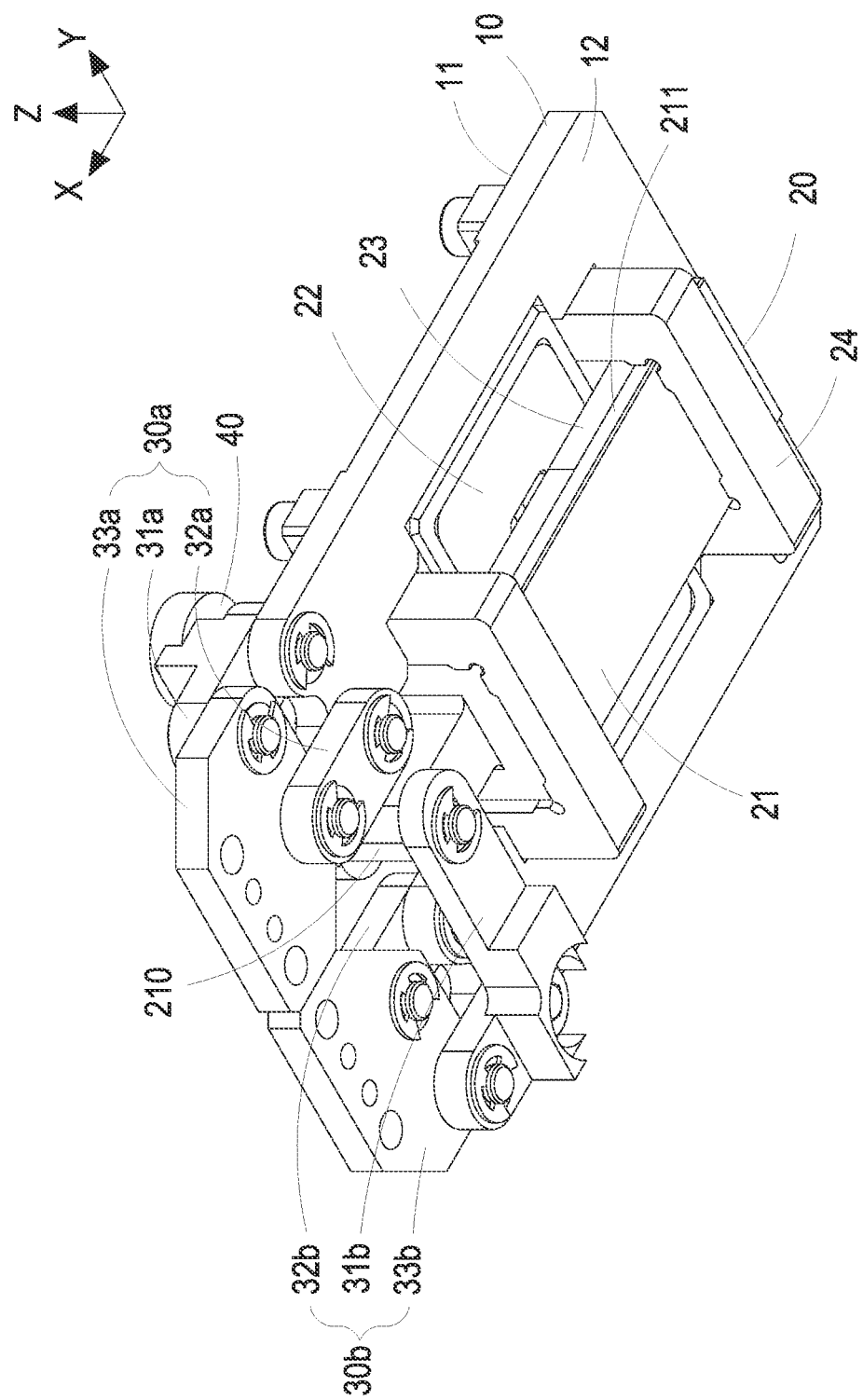
FIG. 7 is a schematic structural view illustrating the electric gripper operated in the closed state according to the first embodiment of the present disclosure and taken from another perspective.
Figure 8:
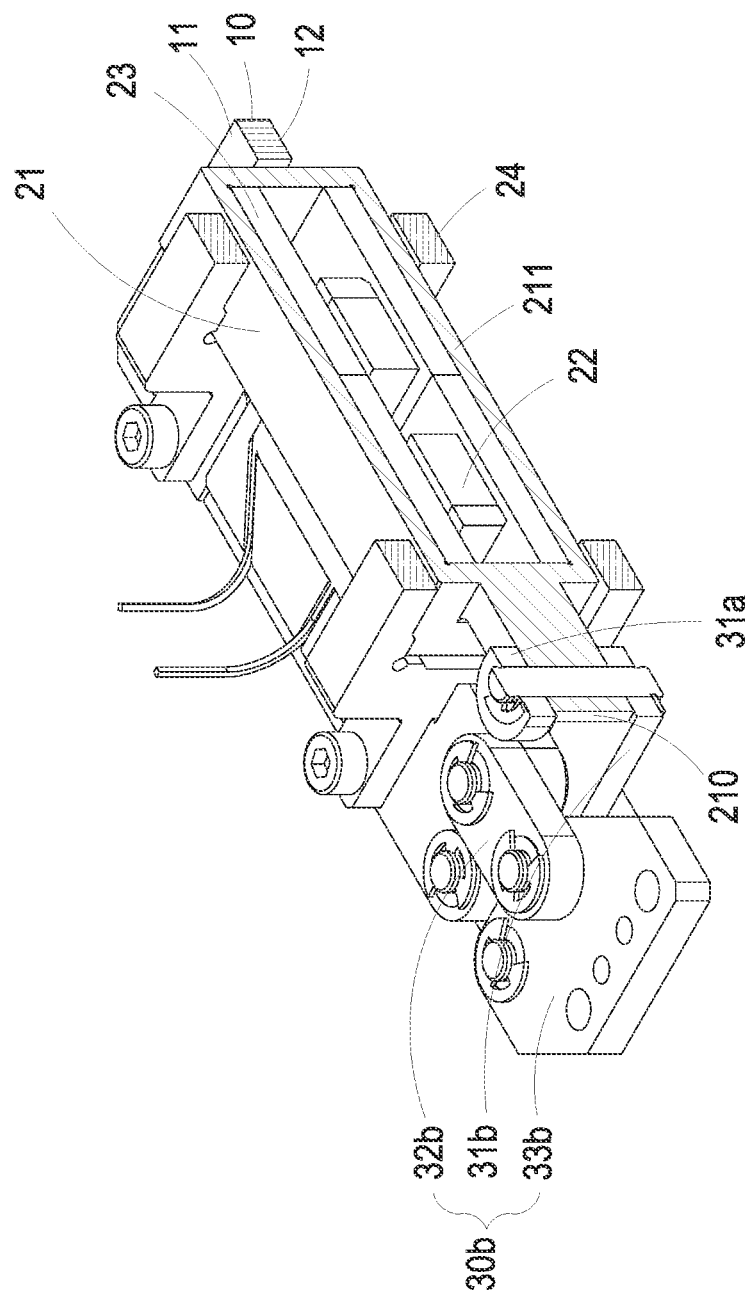
FIG. 8 is a one-side cross-sectional structural view illustrating the electric gripper operated in the closed state according to the first embodiment of the present disclosure.
Figure 9:
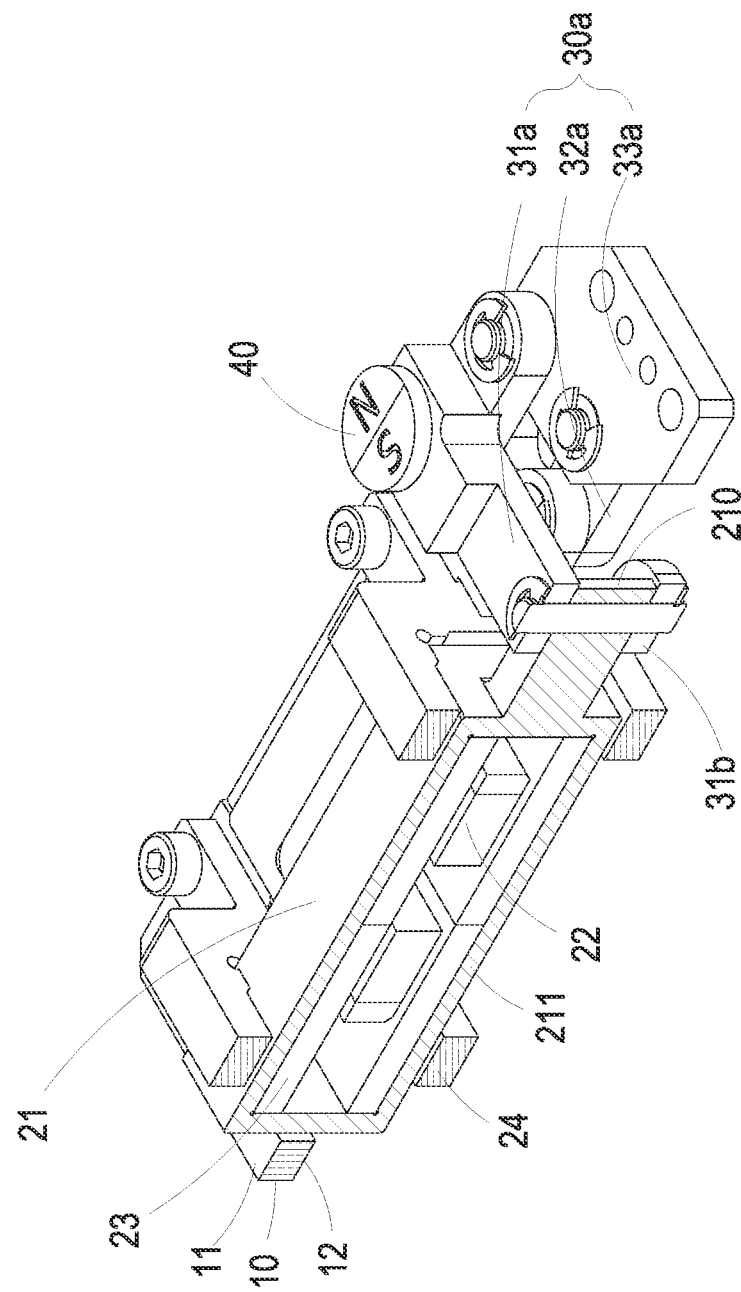
FIG. 9 is another one-sided cross-sectional structural view illustrating the electric gripper operated in the closed state according to the first embodiment of the present disclosure.
Figure 10:
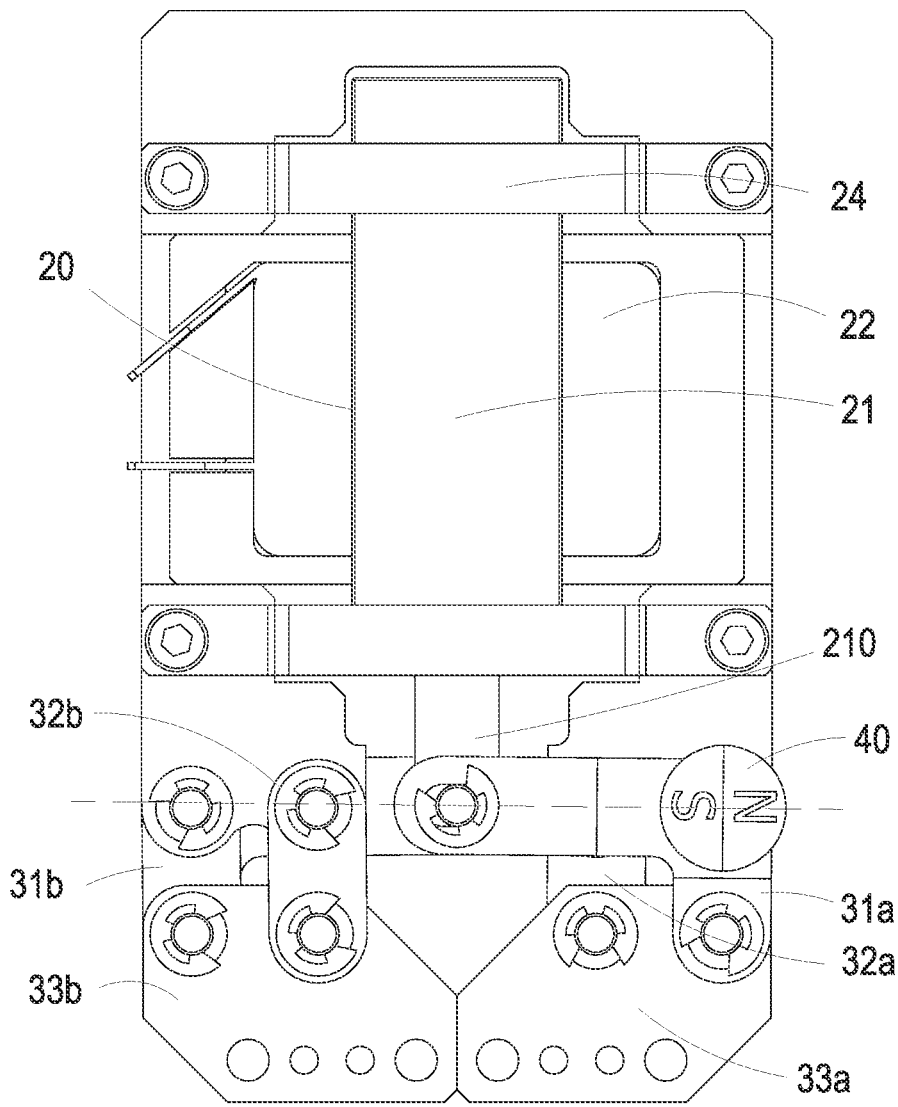
FIG. 10 is a top view illustrating the electric gripper operated in the close state according to the first embodiment of the present disclosure.
Figure 11:
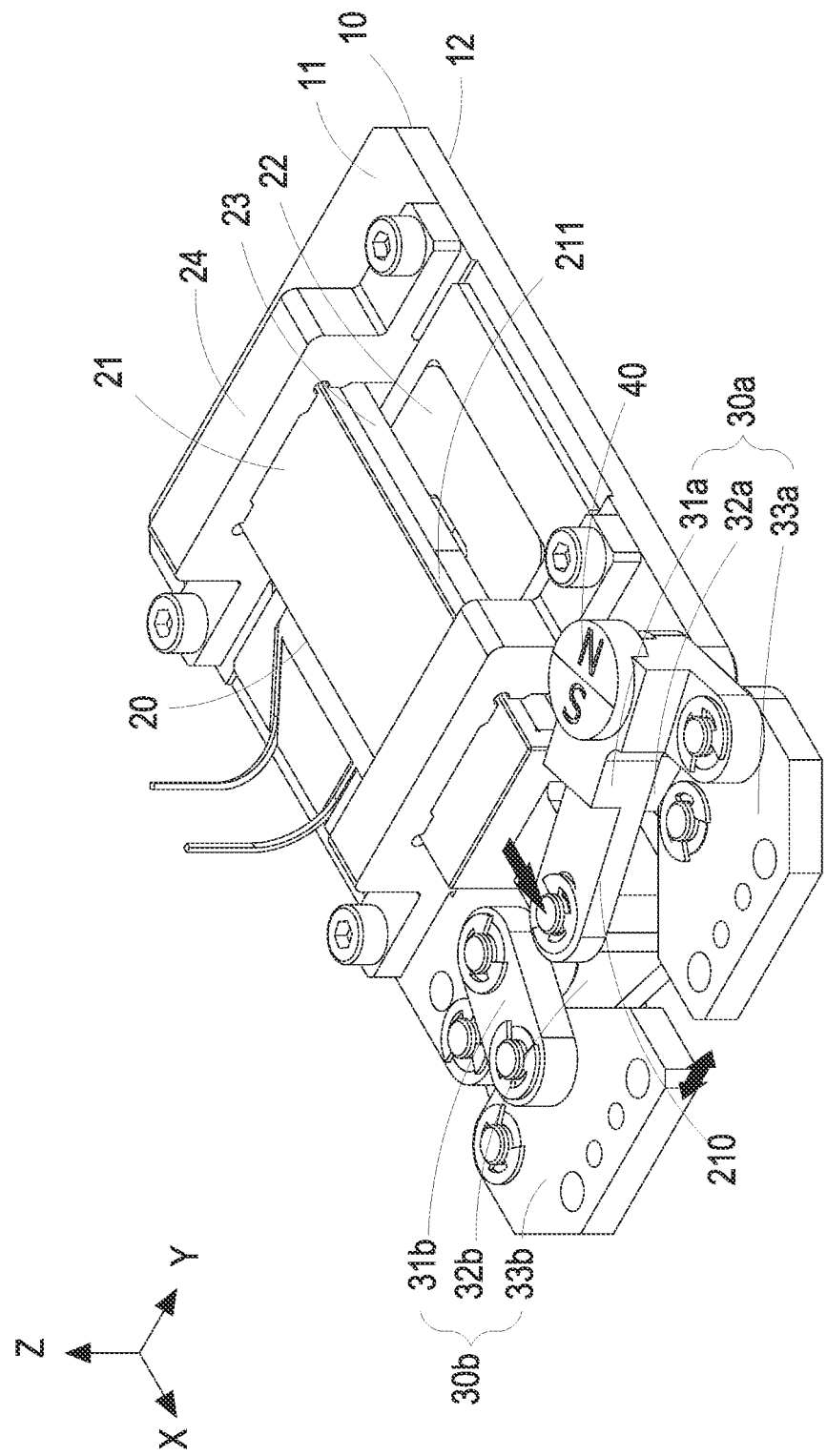
FIG. 11 is a schematic structural view illustrating the electric gripper operated in an open state according to the first embodiment of the present disclosure.
Figure 12:
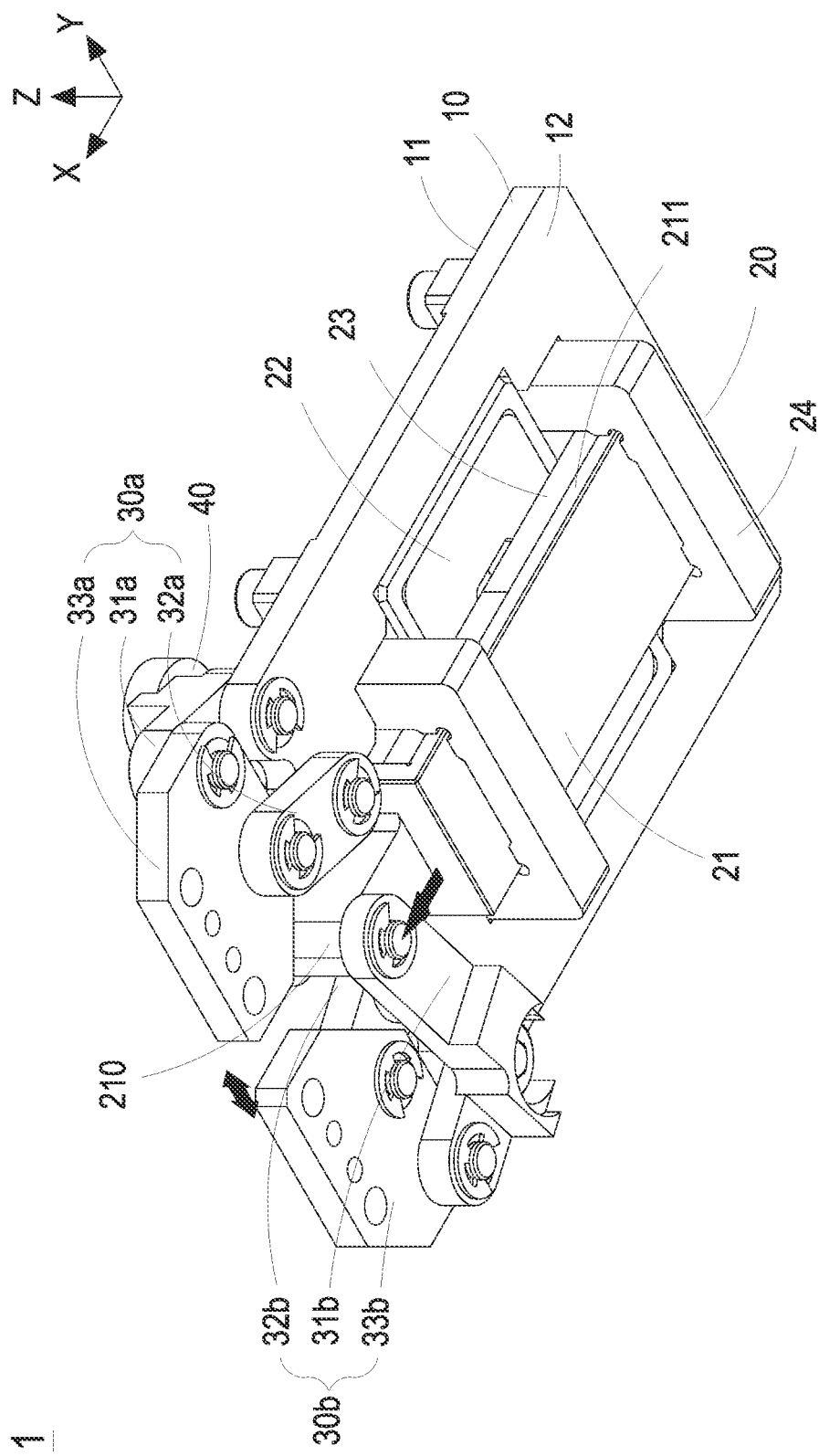
FIG. 12 is a schematic structural view illustrating the electric gripper operated in the open state according to the first embodiment of the present disclosure and taken from another perspective.
Figure 13:
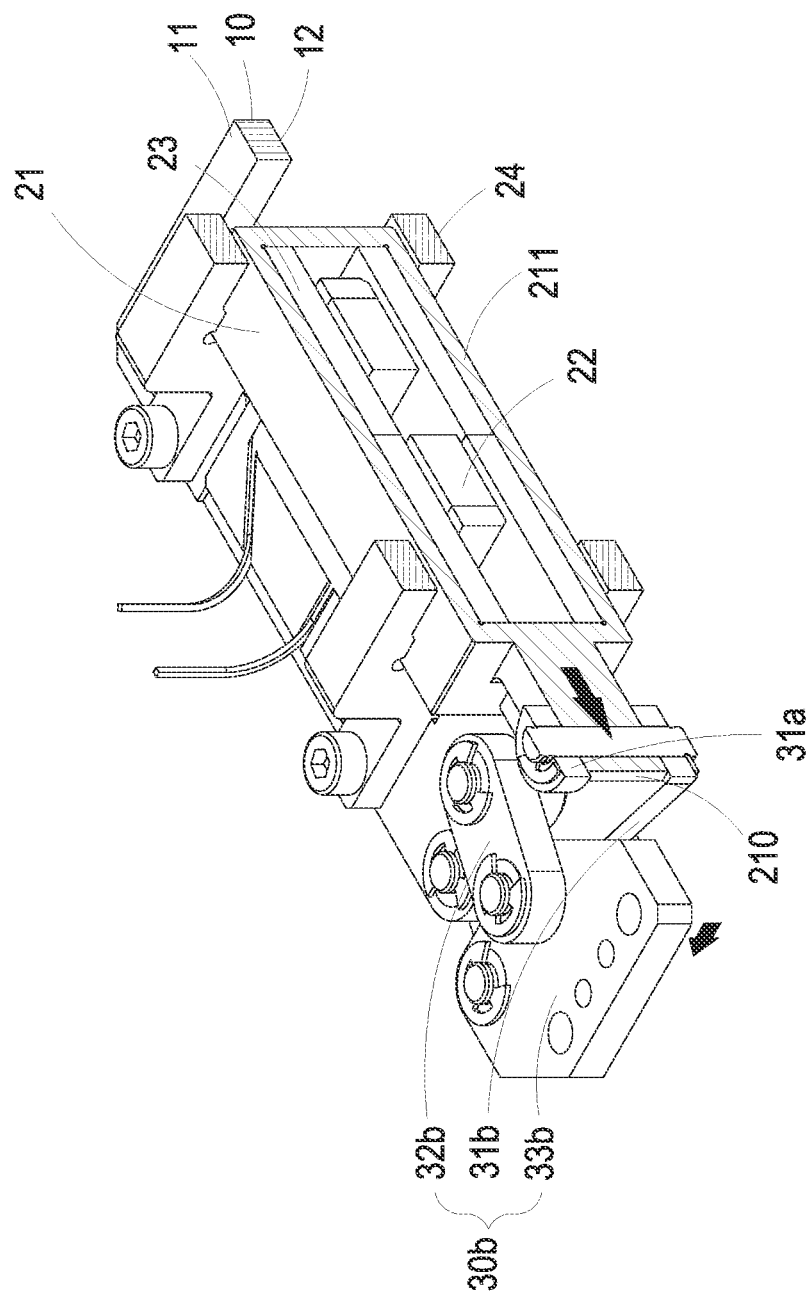
FIG. 13 is a one-side cross-sectional structural view illustrating the electric gripper operated in the open state according to the first embodiment of the present disclosure.
Figure 14:
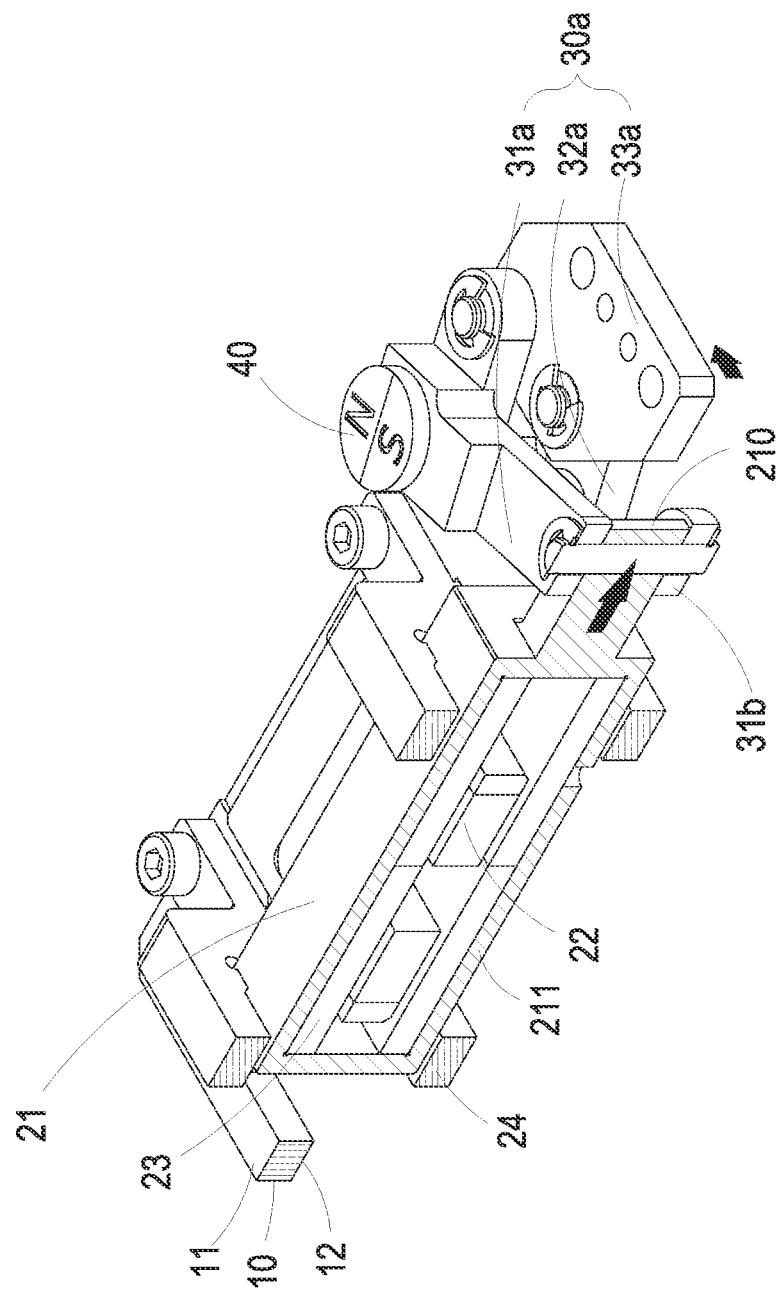
FIG. 14 is another one-sided cross-sectional structural view illustrating the electric gripper operated in the open state according to the first embodiment of the present disclosure.

As shown in FIG. 5, in the embodiment, the electric gripper 1 further includes a control module 50 connected to the actuator 20 and the angle sensor 40, respectively. Preferably but not exclusively, the above-mentioned TABLE list is stored in the control module 50, and the control module 50 controls the actuator 20 to slide and displace the first distance D1 in the first direction (i.e., the X-axis direction). When it is desired to control the relative displacement of the first gripping piece 33a and the second gripping piece 33b to realize the position control target, the control module 50 controls the front end 210 of the sliding portion 21 according to the TABLE list to drive the first driving lever 31a to rotate at the angle θ. In that, the actuator 20 is slid and displaced in the first direction (i.e., the X-axis direction) by a first distance D1, and the first gripping piece 33a and the second gripping piece 33b are relatively displaced, so as to realize the position control target of the second distance D2.

In the embodiment, the sliding portion 21 is disposed on the carrier 10 through a pair of linear bearings 24, and the pair of linear bearings 24 are arranged along the first direction (i.e., the X-axis direction). In the embodiment, the sliding portion 21 includes an elongated frame 211, and a pair of long borders of the elongated frame 211 penetrate the pair of the linear bearings 24 along the first direction (i.e., the X-axis direction). Thus, the actuator 20 drives the sliding portion 21 to slide in the first direction, for example the X-axis direction. Preferably but not exclusively, the actuator 20 is a voice coil motor and includes a coil 22 and a magnet set 23. The coil 22 is disposed between the pair of long borders of the elongated frame 211, the magnet set 23 is disposed on the pair of long borders of the elongated frame 211, and the magnet set 23 is spatially corresponding to two opposite sides of the coil 22. Since the actuator 20 of the voice coil motor is controlled by electric current, the magnet set 23 is driven by the coil 22, and the pushing force is provided stably in one direction, so that the torque of the electric gripper 1 is not changed with the movement. In addition to the position control, the force control is taken into account. With the actuator 20 driving the two dual-lever assemblies 30, the first distance D1 in the first direction (i.e., the X-axis direction) is transferred into the second distance D2 in the second direction (i.e., the Y-axis direction). The control module 50 compares the relative displacement and rotation relationships between the actuator 20 and the two dual-lever assemblies 30 according to the angle θ sensed by the angle sensor 40 to achieve the purpose of position control. Since the voice coil motor (VCM) is served as the actuator 20 in the electric gripper 1, and cooperated with the first dual-lever assembly 30a and the second dual-lever assembly 30b disposed in a staggered arrangement to form a thin design, the electric gripper 1 is realized with low cost, small size, fast response speed and high precision, and the miniaturization of the volume design is achieved easily. Especially in the application field with small clamping force, the miniaturization of the overall volume is taken into account, and the position and force control is realized accurately.

Figure 16:
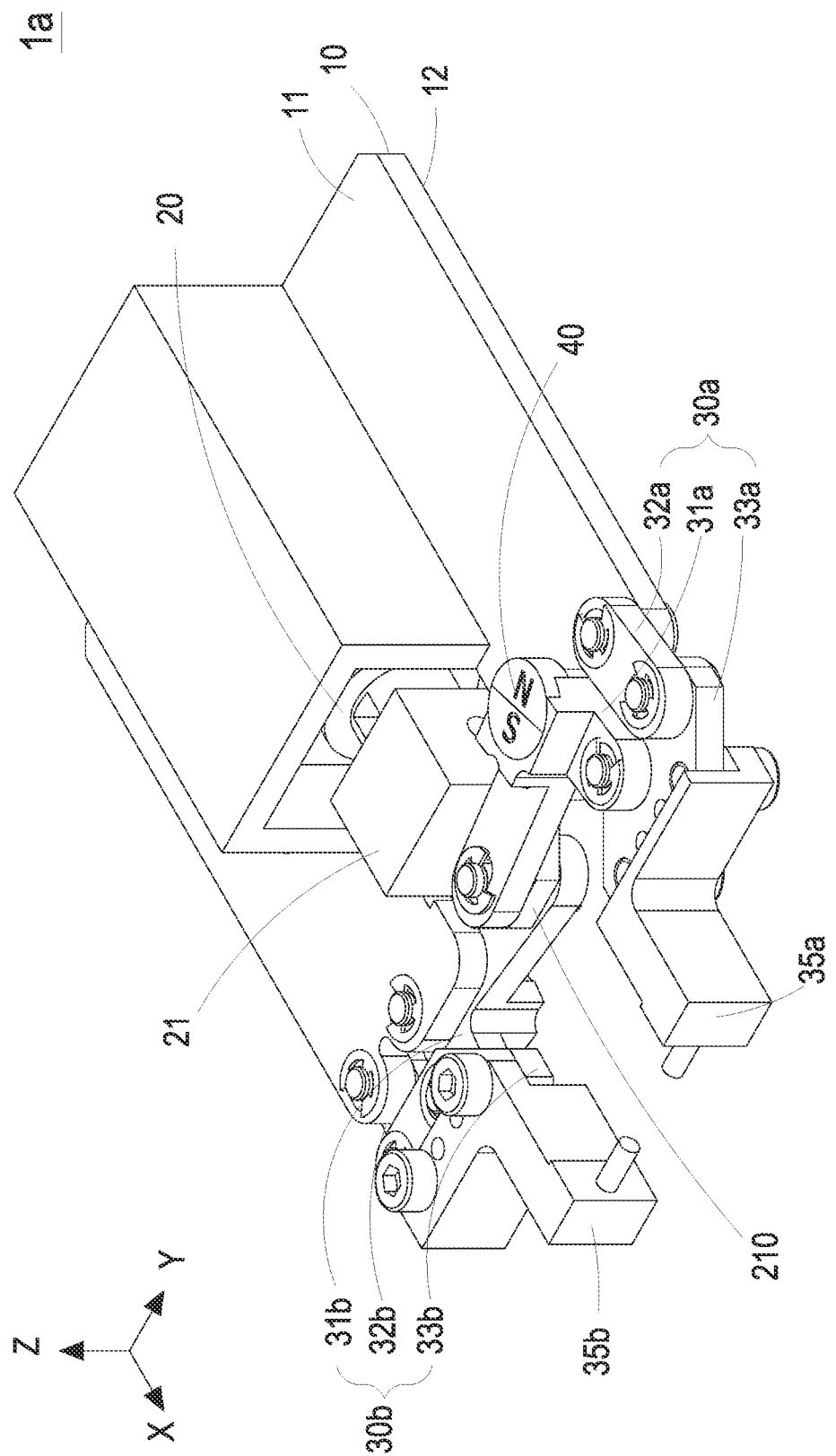
FIG. 16 is an exploded view illustrating an electric gripper according to a second embodiment of the present disclosure.
Figure 17:
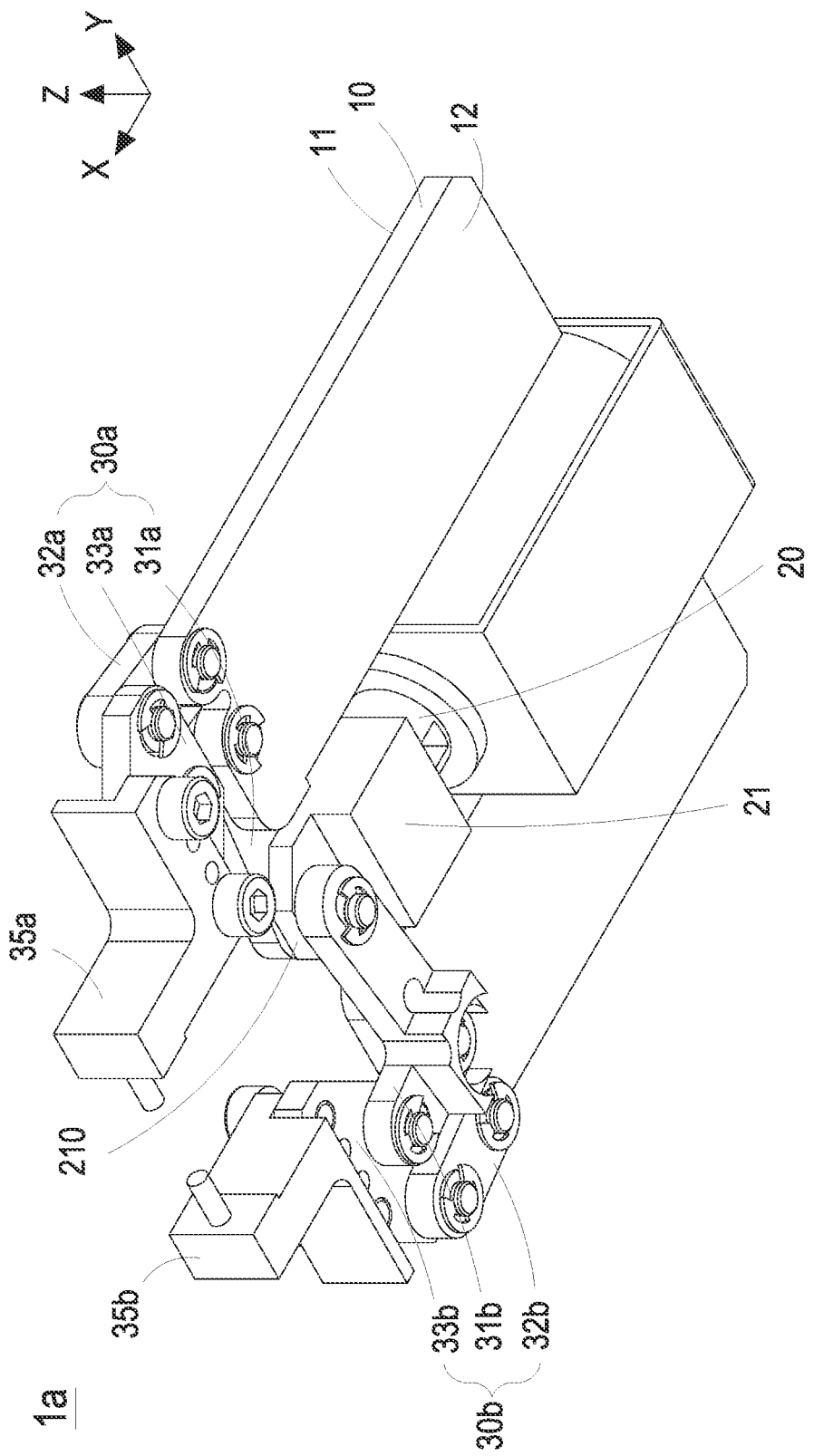
FIG. 17 is an exploded view illustrating the electric gripper according to the second embodiment of the present disclosure and taken from another perspective.

FIGS. 16 and 17 show an electric gripper according to a second embodiment of the present disclosure. In the embodiment, the structures, elements and functions of the electric gripper 1a are similar to those of the electric gripper 1 of FIGS. 1 to 15, and are not redundantly described herein. In the embodiment, the first driving lever 31a and the corresponding first limiting lever 32a of the first dual-lever assembly 30a are disposed on the first surface 11 of the carrier 10, and pivotally connected to the corresponding first gripping piece 33a, respectively. The second driving lever 31b and the corresponding second limiting lever 32b of the second dual-lever assembly 30b are disposed on the second surface 12 of the carrier 10, and pivotally connected to the corresponding second gripping piece 33b, respectively. The first driving lever 31a and the second driving lever 31b are staggered to each other, and connected to the upper side and the lower side of the front end 210 of the sliding portion 21, respectively. The thin design of the electric gripper 1a is helpful of meeting the requirements of low cost, small size, fast response speed and high precision, and the miniaturization of the volume design is achieved easily. In the embodiment, the first gripping piece 33a further includes a first clamping element 35a, and the second gripping piece 33b further includes a second clamping element 35b. The first clamping element 35a and the second clamping element 35b are spatially corresponding to each other, and the shape and the corresponding relationship thereof are adjustable according to the practical requirements, so as to achieve different clamping operations. Certainly, the present disclosure is not limited thereto.

Figure 18:
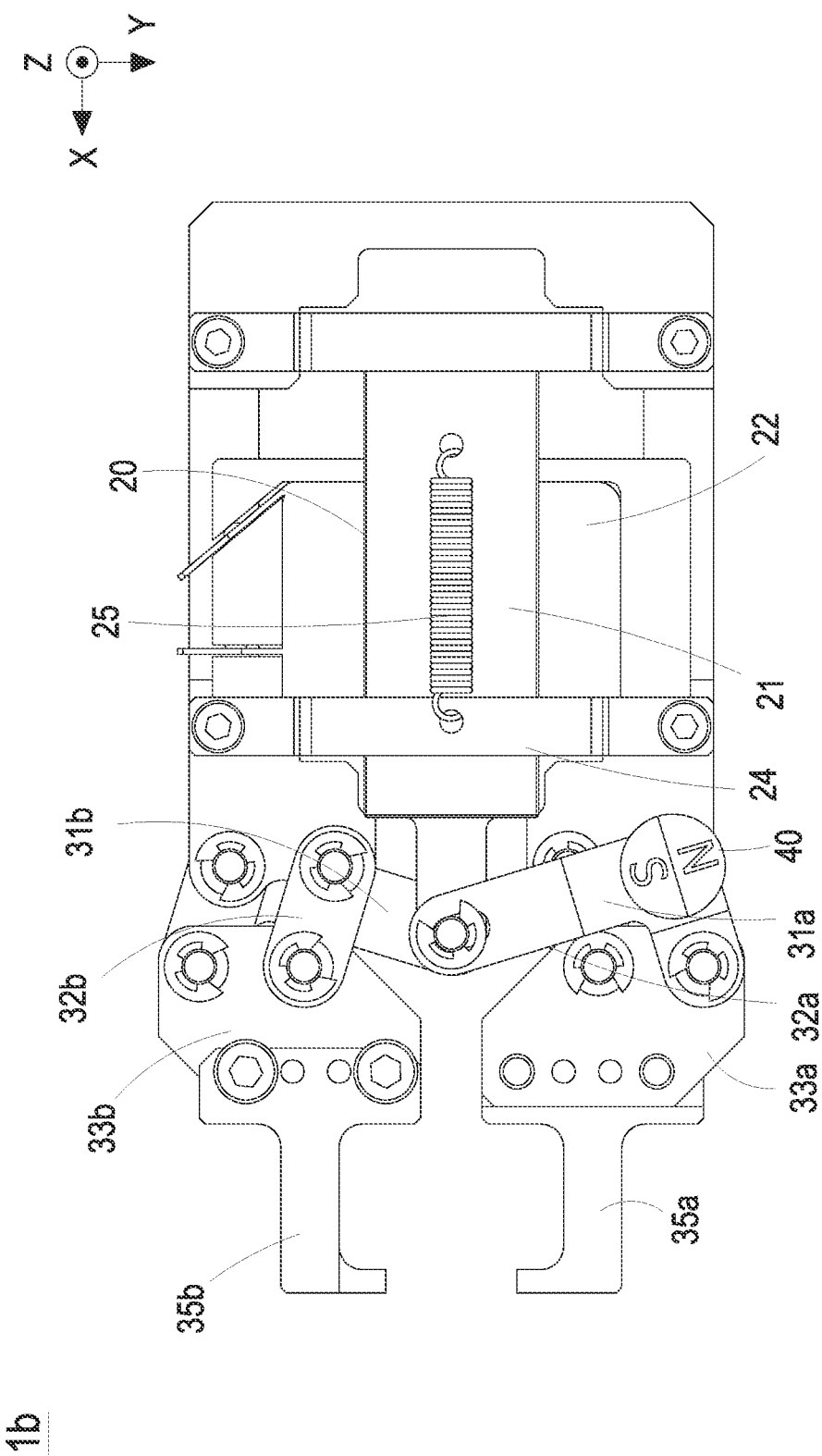
FIG. 18 is a top view illustrating an electric gripper according to a third embodiment of the present disclosure.

FIG. 18 shows an electric gripper according to a third embodiment of the present disclosure. In the embodiment, the structures, elements and functions of the electric gripper 1b are similar to those of the electric gripper 1 of FIGS. 1 to 15, and are not redundantly described herein. In the embodiment, the electric gripper 1b further includes a spring 25. Preferably but not exclusively, an end of the spring 25 is connected to the sliding portion 21 and another end of the spring 25 is connected to the front linear bearing 24, so as to provide a resilience force. When the actuator 20 is powered off, the sliding portion 21 is slid to a final position by the resilience force of the spring 25. With the sliding portion 21 located at the final position, the gripping piece 33a of the first dual-lever assembly 30a and the gripping piece 33b of the second dual-lever assembly 30b are separated from each other to form a maximum separation distance, and the electric gripper 1b is opened completely. In other embodiments, the spring 25 is connected between the sliding portion 21 and the carrier 10, and configured to provide a resilience force for the sliding portion 21 along the first direction (i.e. the X-axis direction). In that, when the actuator 20 is powered off, the sliding portion 21 is slid to the final position. The first distance D1, the second distance D2, and the angle θ (Referring to FIG. 15) are reached to the maximum values. With the arrangement of the spring 25, a self-locking function is achieved when the actuator 20 is powered off, so as to enhance the reliability and competitiveness of the product.

Figure 19:
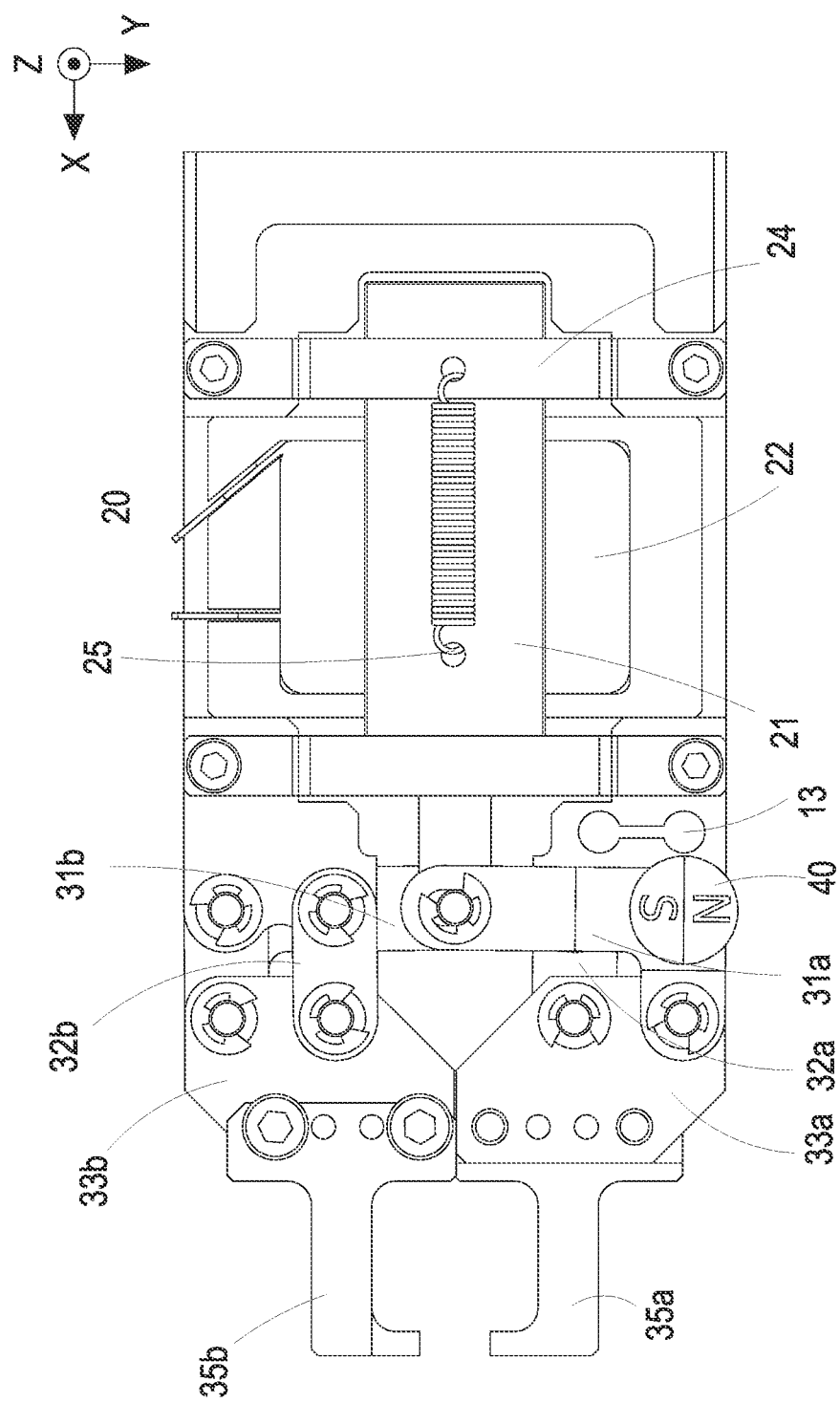
FIG. 19 is a top view illustrating an electric gripper according to a fourth embodiment of the present disclosure.

FIG. 19 shows an electric gripper according to a fourth embodiment of the present disclosure. In the embodiment, the structures, elements and functions of the electric gripper 1c are similar to those of the electric gripper 1 of FIGS. 1 to 15, and are not redundantly described herein. In the embodiment, the electric gripper 1c further includes a spring 25. Preferably but not exclusively, an end of the spring 25 is connected to the sliding portion 21 and another end of the spring 25 is connected to the rear linear bearing 24, so as to provide a resilience force. When the actuator 20 is powered off, the sliding portion 21 is slid to an initial position by the resilience force of the spring 25. In other embodiments, the spring 25 is connected between the sliding portion 21 and the carrier 10, and configured to provide a resilience force for the sliding portion 21 along a direction opposite to the first direction (i.e. the reversed X-axis direction). In that, when the actuator 20 is powered off, the sliding portion 21 is slid to the initial position. With the sliding portion 21 located at the initial position, the gripping piece 33a of the first dual-lever assembly 30a and the gripping piece 33b of the second dual-lever assembly 30b are in contact with each other. The first distance D1, the second distance D2, and the angle θ (Referring to FIG. 15) are zero. In addition to the actuator 20 cooperated with the thin design formed by the first dual-lever assembly 30a and the second dual-lever assembly 30b, the spring 25 is used in the electric gripper 1c to achieve a self-locking function, so as to enhance the reliability and competitiveness of the product.

Figure 20:
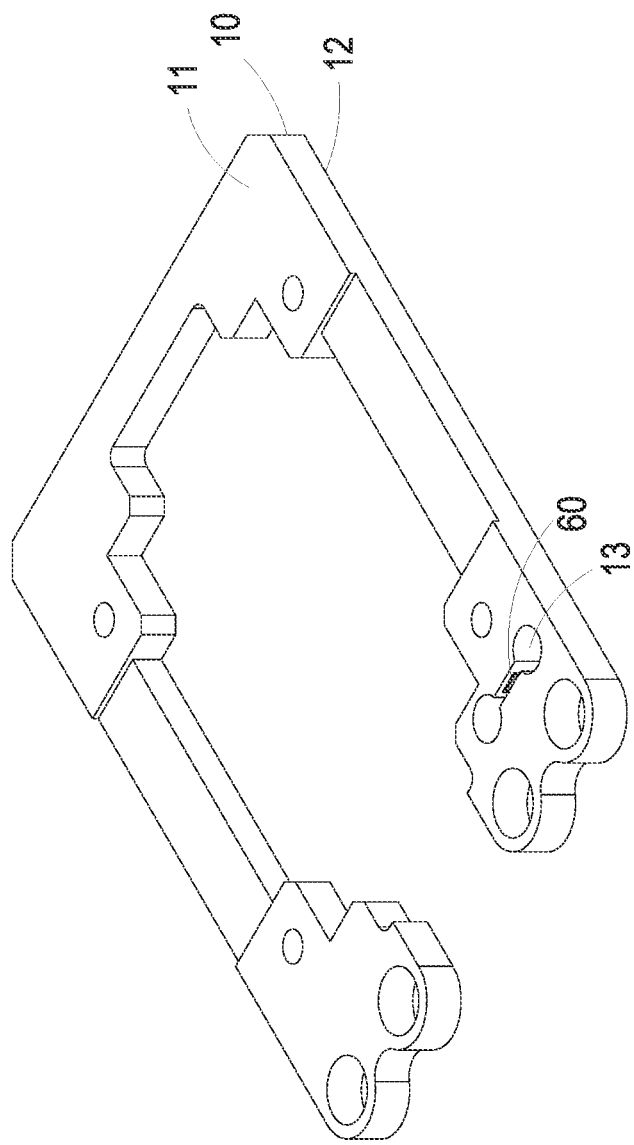
FIG. 20 is a schematic structural view illustrating the carrier of the electric gripper according to the fourth embodiment of the present disclosure.

In addition, FIG. 20 is a schematic structural view illustrating the carrier of the electric gripper according to the fourth embodiment of the present disclosure. As shown in FIGS. 19 and 20, in the embodiment, the carrier 10 further includes a weakened region 13 passed through the first side 11 and the second side 12, and the electric gripper 1c further includes a force sensor 60 disposed in the weakened region 13 of the carrier 10, and configured to measure a force exerted on the electric gripper 1c. Preferably but not exclusively, in an embodiment, the force sensor 60 includes a strain gauge attached to a wall surface in the weakened region 13. When the actuator 20 drives the first driving lever 31a and the second driving lever 31b to perform the operation of the electric gripper 1c, the overall force exerted on the electric gripper 1c is transmitted to the weakened region 13, and the strain gauge of the force sensor 60 is deformed to measure the overall force exerted on the electric gripper 1c. Since the actuator 20 of the voice coil motor is controlled by electric current, the pushing force is provided stably in one direction, so that the torque of the electric gripper 1c does not change with the movement. According to the sensed results of the angle sensor 40 and the force sensor 60, the control module 50 takes into account the position control and further the force control. In other words, by combining the force sensor 60 to highlight the stress change, the force control and the detection of the electric gripper 1c are realized, and the reliability and the competitiveness of the product are further improved.

Figure 21:
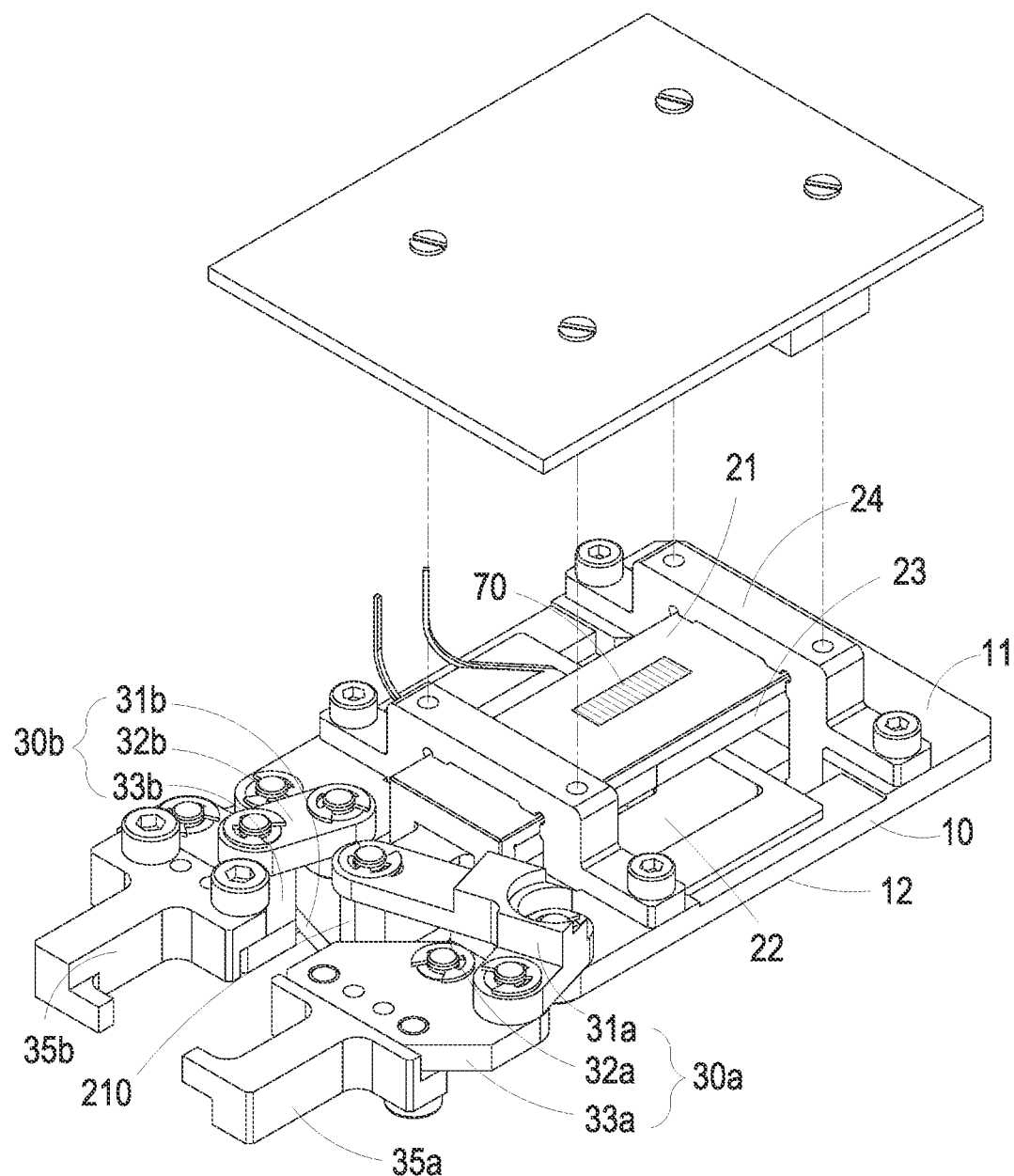
FIG. 21 is an exploded view illustrating an electric gripper according to a fourth embodiment of the present disclosure.

FIG. 21 shows an electric gripper according to a fifth embodiment of the present disclosure. In the embodiment, the structures, elements and functions of the electric gripper 1d are similar to those of the electric gripper 1 of FIGS. 1 to 15, and are not redundantly described herein. In the embodiment, the electric gripper 1d further includes an optical ruler 70 disposed on the sliding portion 21, which is electrically connected to the control module 50 (Referring to FIG. 5), and configured to measure the first distance D1 that the sliding portion 21 slides in the first direction (Referring to FIG. 15). With the optical ruler 70 configured to feedback the first distance D1, the first gripping piece 33a and the second gripping piece 33b are driven by the control module 50 to displace the second distance D2 relative to each other, so that the electric gripper 1d is controlled accurately. Preferably but not exclusively, the relationship between the first distance D1 and the second distance D2 are recorded with in a TABLE list and stored in the control module 50. In other embodiments, the numbers and the arrangements of the force sensor 60 and optical ruler 70 aforementioned are adjustable according to the practical requirements. The present disclosure is not limited thereto and not redundantly described herein.

In summary, the present disclosure provides an electric gripper. In the application field of small clamping force, the overall volume of the electric gripper is miniaturized and the position and force control is accurately realized. Preferably but not exclusively, a voice coil motor (VCM) is served as a driving device in the electric gripper. Moreover, two dual-lever assemblies are disposed in a staggered arrangement to form a thin design. Thus, the electric gripper is realized with low cost, small size, fast response speed and high precision, and the miniaturization of the volume design is achieved easily. Moreover, the displacement distance in the first direction is transferred into the displacement distance in the second direction stably through the two dual-lever assemblies. When the two dual-lever assemblies are driven by for example a voice coil motor, the relative displacement and rotation relationship between the driver and the two dual-lever assemblies are sensed through the sensing element to sense the distance and the angle, thereby achieving the purpose of position control. On the other hand, since the actuator of the voice coil motor is controlled by electric current, the magnet set is driven by the coil, and the pushing force is provided stably in one direction, so that the torque of the electric gripper is not changed with the movement. In addition to the position control, the force control is taken into account. The actuator is cooperated with the thin design formed by the dual-lever assemblies, the configuration of the dual-lever assemblies is adjustable according to the practical requirements, and the force control and the detection of the electric gripper are realized through a force sensor combined therein. In addition, with the actuator cooperated with the thin design formed by the dual-lever assemblies, a self-locking function is achieved through a spring, so as to enhance the reliability and competitiveness of the product.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. An electric gripper, comprising:
a carrier comprising a first side and a second side opposite to each other;

an actuator disposed on the carrier and comprising a sliding portion, wherein the actuator drives the sliding portion to slide in a first direction relative to the carrier;

two dual-lever assemblies disposed on the carrier and located at two opposite lateral sides of the sliding portion, wherein each of the two dual-lever assemblies comprises a driving lever, a limiting lever and a gripping piece, wherein the driving levers of the two dual-lever assemblies are staggered to each other, and have first ends pivotally connected to the first side and the second side of the carrier, respectively, and connected to a front end of the sliding portion, and second ends pivotally connected to the corresponding gripping pieces, wherein the limiting levers of the two dual-lever assemblies are staggered to each other, and have third ends pivotally connected to the first side and the second side of the carrier, respectively, and fourth ends pivotally connected to the corresponding gripping pieces, wherein when the sliding portion slides a first distance in the first direction, the front end of the sliding portion drives the driving levers of the two dual-lever assemblies to rotate an angle, and the gripping pieces of the two dual-lever assemblies move toward each other to displace a second distance in a second direction; and an angle sensor disposed on the carrier and configured to measure the angle, so as to correspond to the first distance and the second distance.

2. The electric gripper according to claim 1, wherein the driving levers of the two dual-lever assemblies are pivotally connected to two opposite sides of the front end of the sliding portion through an elongated hole, respectively, so as to be staggered to each other.

3. The electric gripper according to claim 1, further comprising a control module connected to the actuator and the angle sensor, respectively, wherein the control module controls the actuator to slide and displace the first distance in the first direction, and a TABLE list is stored in the control module and recodes relationships among the angle, the first distance and the second distance.

4. The electric gripper according to claim 1, wherein the driving lever and the corresponding limiting lever of the respective dual-lever assembly are staggered to each other.

5. The electric gripper according to claim 1, wherein the driving lever and the corresponding limiting lever of the respective dual-lever assembly are located at different sides of the carrier.

6. The electric gripper according to claim 1, wherein the driving lever is L-shaped, and the limiting lever is I-shaped.

7. The electric gripper according to claim 1, wherein the gripping piece comprises a clamping element.

8. The electric gripper according to claim 1, wherein the sliding portion is disposed on the carrier through a pair of linear bearings, and the pair of linear bearings are arranged along the first direction, wherein the sliding portion comprises an elongated frame, and a pair of long borders of the elongated frame penetrate the pair of the linear bearings along the first direction.

9. The electric gripper according to claim 8, wherein the actuator is a voice coil motor and comprises a coil and a magnet set, the coil is disposed between the pair of long borders, the magnet set is disposed on the pair of long borders, and the magnet set is spatially corresponding to two opposite sides of the coil.

10. The electric gripper according to claim 1, wherein the angle sensor is a magnetic angular encoder disposed at a position where one of the driving levers of the two dual-lever assemblies is pivotally connected with the carrier.

11. The electric gripper according to claim 1, further comprising a spring connected between the sliding portion and the carrier, and configured to provide a resilience force when the actuator is powered off, so that the sliding portion is slid to an initial position, wherein when the sliding portion is located at the initial position, the first distance, the second distance and the angle are zero, and the gripping pieces of the two dual-lever assemblies are in contact with each other.

12. The electric gripper according to claim 1, further comprising a spring connected between the sliding portion and the carrier, and configured to provide a resilience force when the actuator is powered off, so that the sliding portion is slid to a final position, and the gripping pieces of the two dual-lever assemblies are separated from each other.

13. The electric gripper according to claim 1, wherein the carrier comprises a weakened region passed through the first side and the second side, and the electric gripper further comprises a force sensor disposed in the weakened region of the carrier, and configured to measure a force exerted on the electric gripper.

14. The electric gripper according to claim 1, further comprising an optical ruler disposed on the sliding portion, and configured to measure the first distance that the sliding portion slides in the first direction.

15. The electric gripper according to claim 14, further comprising a control module connected to the actuator and the angle sensor, respectively, wherein the control module includes a TABLE list stored therein, and relationships between the first distance and the second distance are recorded within the TABLE list.

* * * * *